United States Patent
Reitz (12)

(10) Patent No.: US 6,463,881 B2
(45) Date of Patent: Oct. 15, 2002

(54) AUTOMATIC CAT LITTER DEVICE AND METHOD

(76) Inventor: Donald D. Reitz, 7484 E. Cedar Ave., Denver, CO (US) 80230

( * ) Notice: Subject to any disclaimer, the term of this patent is extended or adjusted under 35 U.S.C. 154(b) by 0 days.

(21) Appl. No.: 09/820,437

(22) Filed: Mar. 29, 2001

(65) Prior Publication Data
US 2002/0139312 A1 Oct. 3, 2002

(51) Int. Cl.$^7$ .............................................. A01K 29/00
(52) U.S. Cl. ........................ 119/163; 119/165; 119/170
(58) Field of Search .................... 119/1, 161, 162–174; 223/39; 160/349.1

(56) References Cited

U.S. PATENT DOCUMENTS

| | | | |
|---|---|---|---|
| 4,120,264 A | 10/1978 | Carter | |
| 4,846,104 A | 7/1989 | Pierson, Jr. | |
| 5,507,252 A | 4/1996 | Ebert | |
| 5,662,066 A | 9/1997 | Reitz | |
| 5,713,302 A | 2/1998 | Walter | |
| 6,055,935 A | * 5/2000 | Engel ......................... | 119/170 |

OTHER PUBLICATIONS

Advertisement for "LitterMaid" p. 71, World Traveler, Jan. 1996.
Advertisement for "LitterMaid" p. 49, The Sharper Image Catalog, Holiday 1995.

* cited by examiner

Primary Examiner—Charles T. Jordan
Assistant Examiner—Bret Hayes
(74) Attorney, Agent, or Firm—Holland & Hart LLP

(57) ABSTRACT

An animal litter device includes a chamber that is rotatable about a generally horizontal axis, the chamber having a first-rotation position and a second-rotation position. An internal portion of the chamber is disposed at a bottom of the chamber when the chamber is in the its first rotation position whereat the chamber is usable by an animal, and this internal portion of the chamber is disposed generally at a top of the chamber when the chamber is in its second rotation position whereat the chamber is not usable by an animal. A dump opening is located at a second portion of the chamber, the dump opening being located at or near a top of the chamber when the chamber is in its first-rotation position, and being located at a bottom of the chamber when the chamber is in its second-rotatable position. A moisture impervious, flexible, and weighted liner has boarder portions thereof fixed to the interior of the chamber, and has a weighted mid-portion covering the internal portion of the chamber and movable relative thereto. A mass of litter loosely sits on the flexible liner when the chamber is in its first rotation position. Waste separation means within the chamber operates when the chamber is rotated in a first direction between its first-rotatable position and its second-rotatable position to separate animal waste from the mass of litter, whereupon the separated animal waste exits the chamber by way of the waste opening. When the chamber is rotated in a second direction between its first-rotatable position and its second-rotatable position, the mass of litter to exits the chamber by way of the exit opening.

35 Claims, 12 Drawing Sheets

AUTOMATIC CAT LITTER DEVICE AND METHOD

CROSS-REFERENCE TO RELATED APPLICATION

U.S. Pat. No. 5,662,066 entitled AUTOMATIC CAT LITTER DEVICE AND METHOD is incorporated herein by reference.

BACKGROUND OF THE INVENTION

1. Field of the Invention

This invention relates to the field of animal husbandry, and more specifically to a liter box device having means for automatically separating animal waste from absorbent litter material.

2. Description of the Related Art

This invention provides improvements to the automatic cat litter device that is described in U.S. Pat. No. 5,662,066 that describes a cat litter device having a hollow rotatable sphere-shaped chamber that sits on top of a support pad. The support pad is in the shape of a hollow and upright cylinder. It is suggested that the support pad be formed in a frusto-conical section for additional strength and stiffness. The chamber holds a supply of litter, it is rotatable about a generally horizontal axis, and it is supported on the upper part of the support pad by way of low-friction support means. A first opening in the chamber provides for the entrance and exit of a cat, and second openings are provided whereby waste material may be dropped into a waste storage bag that is contained within the support pad. Periodically, the chamber rotates and a screen that is within the chamber then operates to separate animal waste from the litter; i.e., the litter is cleaned of waste. Continued rotation of the chamber then causes the separated waste to drop out of the chamber and into the storage bag, whereupon the chamber returns to its original position. The chamber may rotate at periodic time intervals, or it may rotate at a time interval after the presence/absence of a cat within the sphere-shaped chamber has been detected. The use of a motion detector is suggested to detect use by the cat. The rotatable chamber carries magnets. A Hall-effect sensor detects the magnets, and thereby detects the rotational position of the chamber. A controller responds to the output of the Hall-effect sensor and controls a bi-directional motor that operates to rotate the chamber.

U.S. Pat. No. 4,120,264 is also of general interest in that it provides a sanitary facility for pets that includes a rotatable chamber that contains pet litter. A grate is provided within the chamber to allow clean litter to pass therethrough, but to retain and thus separate agglomerated litter and solid animal excrement. Gravity and the grate cooperate as the chamber is rotated to move matter retained on the grate so as to exit the chamber.

Relatively simple open top plastic boxes that contain a quantity of litter are known, and it is also known that when litter is to be periodically changed, the box is manually inverted to thus allow the spent litter and the waste that is contained therein to gravity fall into a garbage container or the like. In this manual box emptying process, it is sometime necessary to use the hand to pound on the bottom of the box, and/or it may be necessary to manually scrape the bottom of the box with a tool to ensure that all spent litter is released from the bottom of the box.

While the art provides a number of sanitary facilities or cat litter devices for use by pets such as cats, the need remains in the art for improvements to such facilities and devices.

SUMMARY OF THE INVENTION

This invention provides a new and an unusual sanitary device or litter device for use by pets and animals such as cats.

Devices in accordance with this invention include a rotatable chamber whose bottom surface includes a flexible liner (for example, a liner that is made of the synthetic thermo plastic elastomer (TPE) such as the brand Santoprene), and preferably a weighted flexible liner. A quantity of litter is placed on top of this flexible liner, the litter taking the physical shape of a relatively thick layer or pile. In an embodiment of the invention, the device held about 14-pounds of litter.

As a pet makes use of the sanitary device, urine and solid waste is deposited on top of and within the mass of litter. Later, and after the pet has exited the chamber, automatic inversion of the chamber causes the quantity of litter to gravity fall through a screen whose opening size (about ¼-inch square) allows only clean litter to pass therethrough. That is, urine/litter clumps and solid waste is retained on the screen for disposal to a waste bag.

The flexible liner also gravity falls when the chamber is placed in this inverted position. The resulting flexing and movement of this liner ensures that all of the litter, including all of the litter clumps, are released from the liner to then fall toward the above-mentioned screen.

As used herein, the term screen is intended to mean any member that separates course particles from finer particles, and more specifically, any member that separates solid animal waste, including clumps that are formed when urine wets litter from relatively clean litter particles.

As a feature of the invention, the bottom of the chamber includes one or more air holes that prevent vacuum adherence of the liner to the wall of the chamber, and as an additional feature of the invention, the air hole size is selected to control the rate of gravity falling or movement of the flexible liner when the chamber is placed in the inverted position.

When the chamber is in the shape of a sphere, the above-mentioned liner is in the shape of a hemisphere; for example, a polymer material that is pre-formed in the shape of a hemisphere or a portion of a hemisphere.

While the above-mentioned liner is operable as-is as a feature of the invention, a weight is attached to the bottom of the flexible liner, and generally at the center of the liner. This weight assists in the gravity-induced falling and flexing of the liner when the chamber is in its inverted position. While in an embodiment of the invention, the above-mentioned weight comprised a metal disk that was physically attached to the liner, it is within the spirit and scope of this invention to use virtually any means to provide greater weight to the liner, and to thereby assist in the gravity-induced falling and flexing of the liner when the chamber is in its inverted position In an embodiment of the invention, the above-described flexible liner was vacuum formed or injection molded Santoprene-brand thermo plastic elastomer material having a thickness of about 1.5 mm, and the above-described weight weighed from about 400 to about 500 grams (i.e., about one pound).

As a feature of the invention, rotation of the chamber is provided by the energization of a bi-directional motor, the motor being controlled by a controller that includes a microprocessor.

In one mode of operation of the control circuitry, the presence of a cat within the chamber is detected by the operation of a switch that is connected to a front-located spring biased/loaded support leg that supports the device on a floor or the like. This support leg is spring-loaded in a downward direction such that entry of the cat into the chamber causes a switch to be actuated from a first switch state to a second switch state. Later, when the cat exits the chamber, this switch is actuated back to the first state. This cycling of the leg switch operates to actuate a timer, and at the end of a timed interval (for example, seven minutes), the above-mentioned motor is energized to rotate the chamber to screen filter the litter and to cause the screen separated waste material to be gravity dumped, thereafter controlling the motor to reset the chamber to its home position. In this mode of operation, should a second cat enter the chamber during the timing interval, the above process is aborted, and the process resets only after the leg switch has again been cycled by the second cat exiting the chamber.

As a feature of the invention, the above-described spring biased support leg is located generally under a front-disposed opening through which a cat passes as it enters the chamber. In the absence of a cat within the chamber, the device is three point supported on a floor or the like by this spring biased support leg and by two physically spaced and fixed position rear legs. When a cat is present within the chamber, thus causing the front of the device to move vertically downward, two physically-spaced and fixed position front legs move down and into engagement with the floor as the movable leg actuates the above described switch, thus providing a more stable four-point support for the device when a cat is present in the chamber.

In another mode of operation, a manually-operable switch is provided to initiate the above-described litter cleaning cycle, and should this cycling switch be actuated during the above-described timing interval, the timing interval is aborted, and the above-described litter-cleaning cycle begins immediately. As a feature of the invention, this mode of operation can be prevented when it is sensed that a second cat has entered the chamber.

In another mode of operation, a manually-operable switch is provided to control the above-described motor in a manner to cause the chamber to rotate to a position whereat the litter itself to be gravity dumped out of the chamber, thus enabling fresh litter to be introduced into the chamber. In a related mode of operation, a manually-operable switch is provided to control the motor to cause the chamber to rotated to a position whereat new litter can be gravity dumped down into the chamber.

As an additional feature of the invention, three indicator lights (LEDs) are provided to indicate the state of operation of the device. Energization of a green OK/waiting light indicates that the chamber is in its home position, awaiting use by an animal. Energization of a yellow cycling/in-use light indicates that the above-described motor is operating to rotate the chamber. Energization of a red light indicates that an animal is within the chamber. Energization of a red sensor/timing light indicates that the above-mentioned control circuitry is measuring the above-described time interval, prior to the beginning of a litter cleaning cycle. In a failure mode, all three of the above-described lights flash.

In another mode of operation, a manually-operable switch is provided to control the above-described motor to cause the chamber to rotate to a position whereat openings within the chamber are located to provide for the convenient placing of a new supply of litter within the chamber.

These and other features and advantages of the invention will be apparent to those of skill in the art upon reference to the following detailed description, which description makes reference to the drawing.

DESCRIPTION OF THE PREFERRED EMBODIMENT(S)

Figure 1:
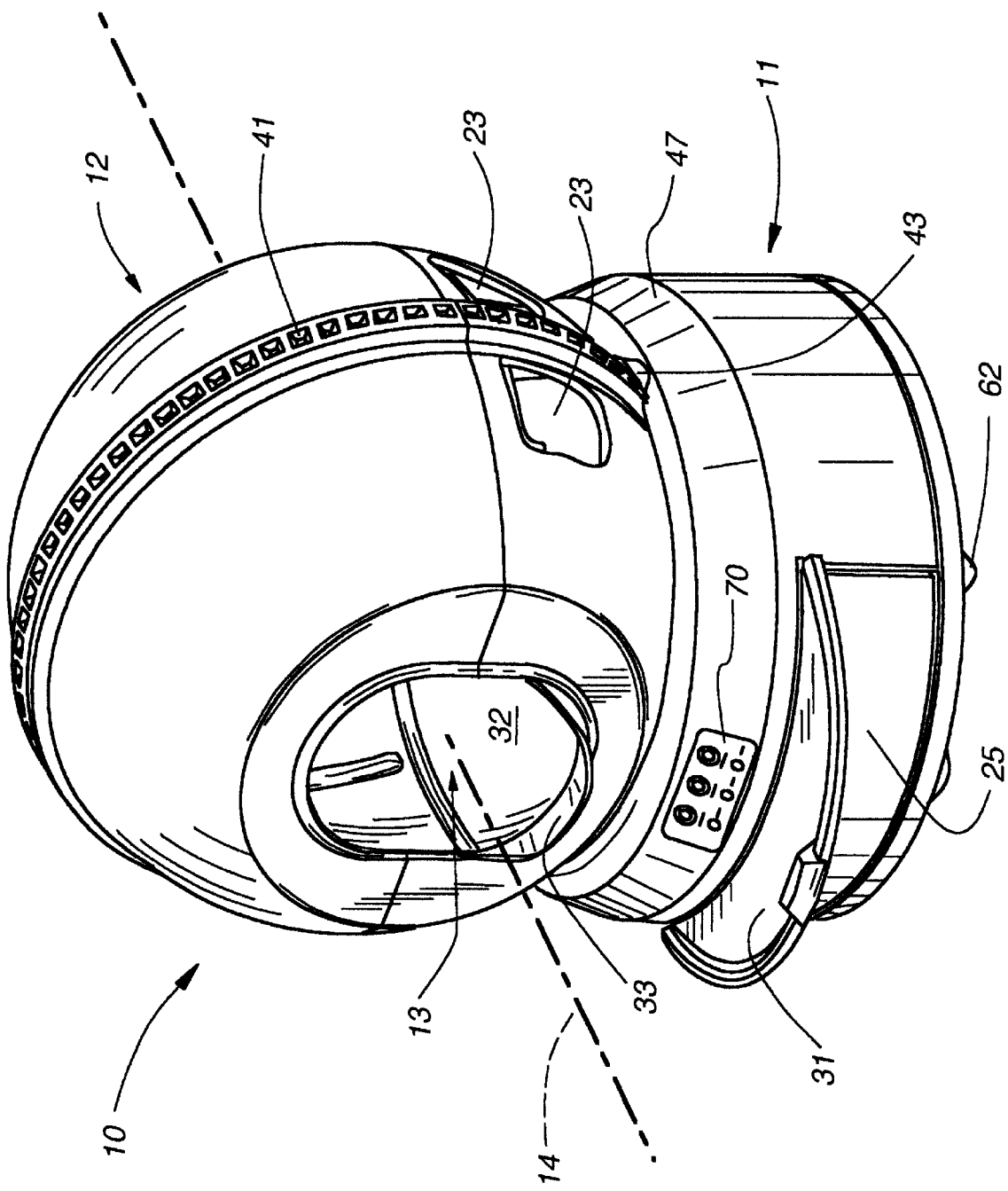
FIG. 1 is a front and right-side perspective view of an animal litter device in accordance with the invention, this view showing a manually-operable control panel that is disposed below an animal enter/exit opening and two right-side waste discharge openings that are contain within the wall of the hemisphere-shaped chamber that is rotatable about a generally horizontal axis.
Figure 2:
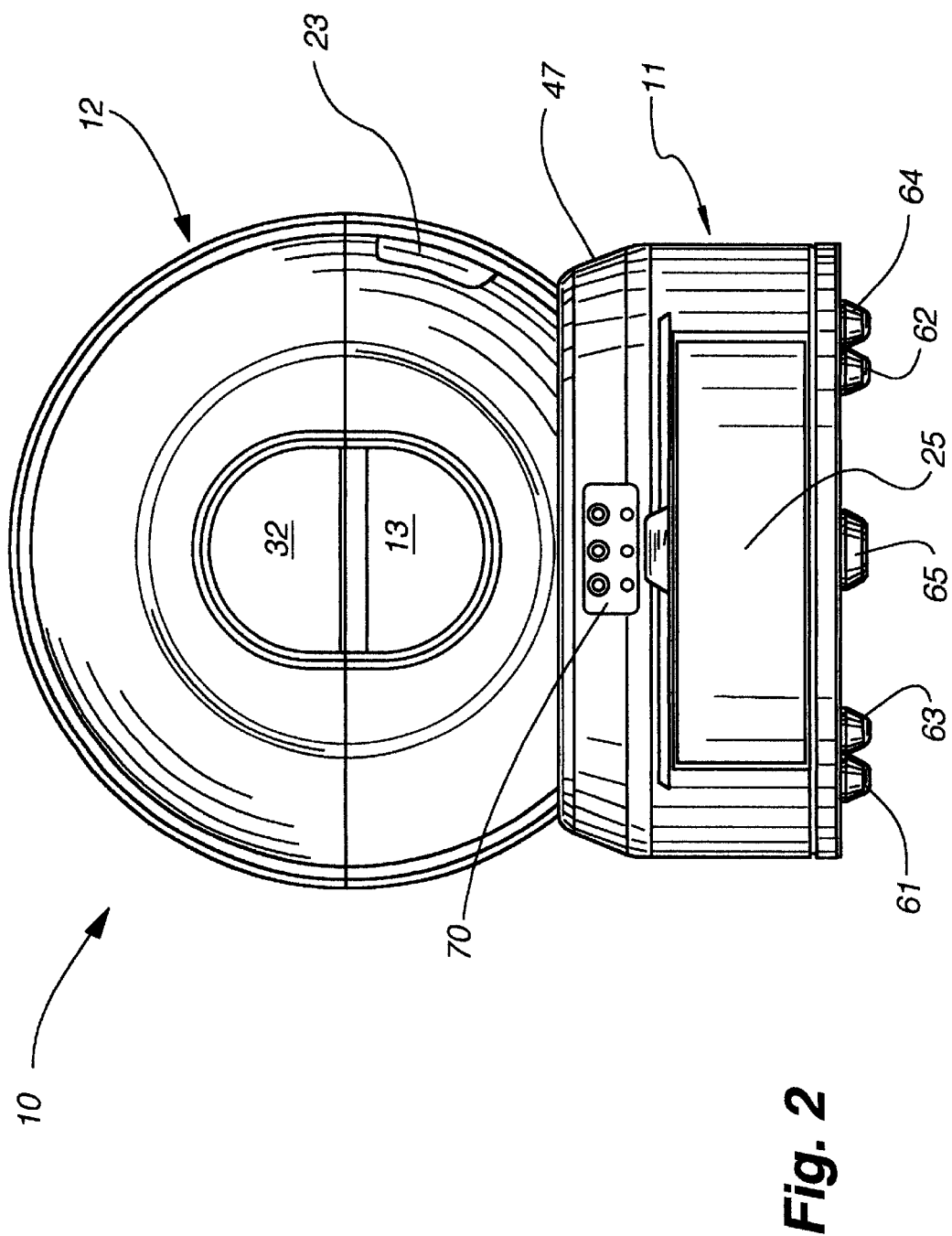
FIG. 2 is a front view of the device of FIG. 1, this view better showing the support feet by which the device is selectively supported on a generally horizontal floor.

The present invention provides a number of new and unusual improvements to the cat litter device that is shown and described in above-mentioned U.S. Pat. No. 5,662,066.

As is well-known to cat owners, the normal operation of a cat litter box often includes the sticking of cat waste, including damp clumps of litter that are saturated with urine, to the bottom of the device. Often this stuck waste material must be removed by hammering on the bottom of the litter box, or by scrapping the waste material loose from the bottom of the litter box. It is also known that commercially-available clumpable litter operates to create a clump of litter around liquid waste material, thus making it easier to clean the litter of both urine and solid waste.

One significant feature of the present invention is the provision of a flexible liner 13 (see FIG. 6) that operates to release stuck litter clumps from the bottom of a rotatable chamber 12 of the general type that is described in U.S. Pat. No. 5,662,066. In operation, when the chamber of the present invention is inverted, the liner gravity drops and thereby inverts its shape; i.e., the liner gravity drops away from the normally bottom interior surface of the chamber. This shape inversion of the liner operates to release litter and litter clumps that may be stuck to the liner, thus allowing the released litter clumps to gravity drop into a separation screen of the generally type described in U.S. Pat. No. 5,662,066.

In a preferred embodiment of the invention (see FIG. 6), the flexible liner 13 was a generally hemisphere-shaped liner that was formed of a relatively thin (1.5 mm) Thermo Plastic Elastomer (TPE) (the Santoprene brand) having about a one-pound metal weight 15 (see FIG. 4) generally centered thereon. However, the spirit and scope of the invention is not to be limited to this detailed construction and arrangement.

In an embodiment of the invention, flexible liner 13 was formed of the brand Santoprene thermoplastic elastomer (TPE) made by Adv. Elastomers, and, more specifically, liner 13 was formed of a rectangular piece of Santoprene Sheet Black 101-64 that was about 0.060-inch thick by 33-inch by 39-inch.

With reference to the figures, cat litter device 10 of the present invention includes two basic components, (1) a support base 11 that includes control electronics, a control panel, a Hall sensor, a bi-directional drive motor and a waste drawer, and (2) a removable/rotatable chamber 12 that includes two magnets, which magnets cooperate with the Hall sensor to enable sense the protestation position of the rotatable chamber.

In a preferred embodiment, chamber 12 is in the shape of a plastic globe or a truncated sphere that loosely sits on the top of plastic support base 11. That is, chamber 12 can be lifted off of support base 11 for cleaning and the like. It is to be noted that no electrical components are contained within chamber 12. Without limitation thereto, globe/chamber 12 can be formed of two plastic hemisphere portions that are bolted together on a horizontal plane or a vertical plane.

Electrical power is supplied to support base 11 by way of a power supply housing that plugs directly into a conventional 110 VAC wall outlet, this housing having a low voltage cable that connects to support base 11. For convenience, this power supply housing and low voltage cable have not been shown.

Above-described liner 13 within the bottom of chamber 12 (i.e., the bottom of chamber 12 when it is in its home position) ensures that litter will not stick to the bottom surface of chamber 12 during a waste removal cycle during which chamber 12 is rotated counterclockwise (CCW see arrow 18 of FIGS. 4 and 5) about horizontal axis 14. As chamber 12 rotates in this manner, a mass of litter 16 and liner 13 are carried upward, whereupon litter mass 16 gravity drops downward onto a metal or plastic screen 17, as liner 13 and its weight 15 also gravity drop downward and out of physical contact with the interior bottom surface 19 of chamber 12.

Figure 6:
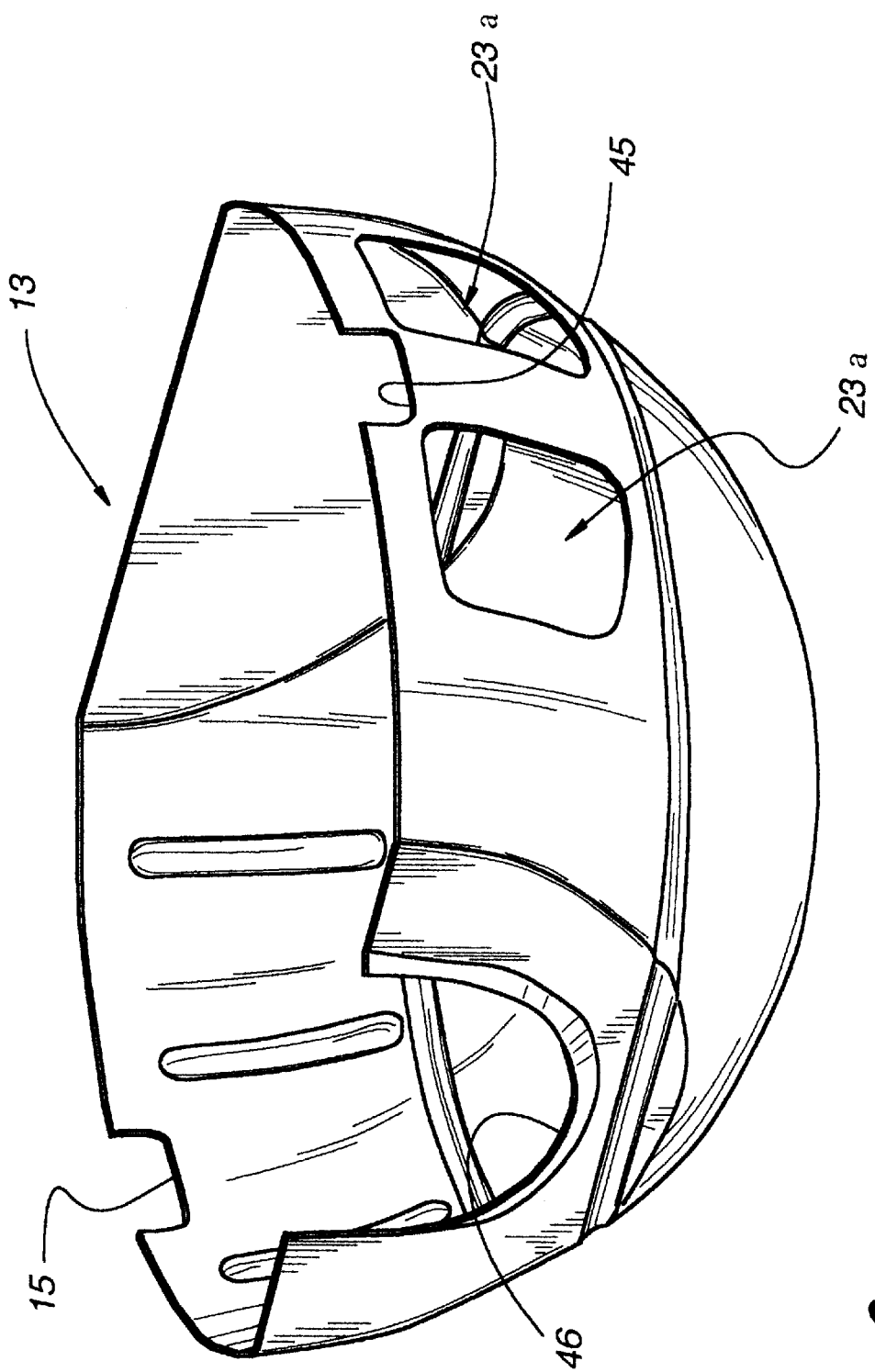
FIG. 6 is a front and right-side perspective view of the hemisphere-shaped flexible liner that is contained within the bottom of the rotatable hemisphere-shaped chamber shown in FIG. 1.

The screen-size of screen 17 (for example, square ¼ by ¼-inch openings) is selected to separate animal waste and urine/litter clumps from litter mass 16, as relatively clean litter passes through screen 17, to be retained in a compartment 19 that is formed by a solid metal or plastic separator wall or septum 20, and the adjacent interior surface of chamber 12. In this way, solid animal waste and litter clumps are sifted from the relatively clean litter mass. After some-what less than a complete CCW rotation of chamber 12 (about 270-degrees), the screen-separated waste falls through the two waste openings 23 that are formed in chamber 12, all as is described in U.S. Pat. No. 5,662,066. Note that two waste openings 23 are also provided in liner 13 as is seen in FIG. 6, the waste openings 23 in liner 13 being physically aligned with the waste openings 23 in chamber 12. In addition, similar openings may also be provided in septum 20.

Figure 5:
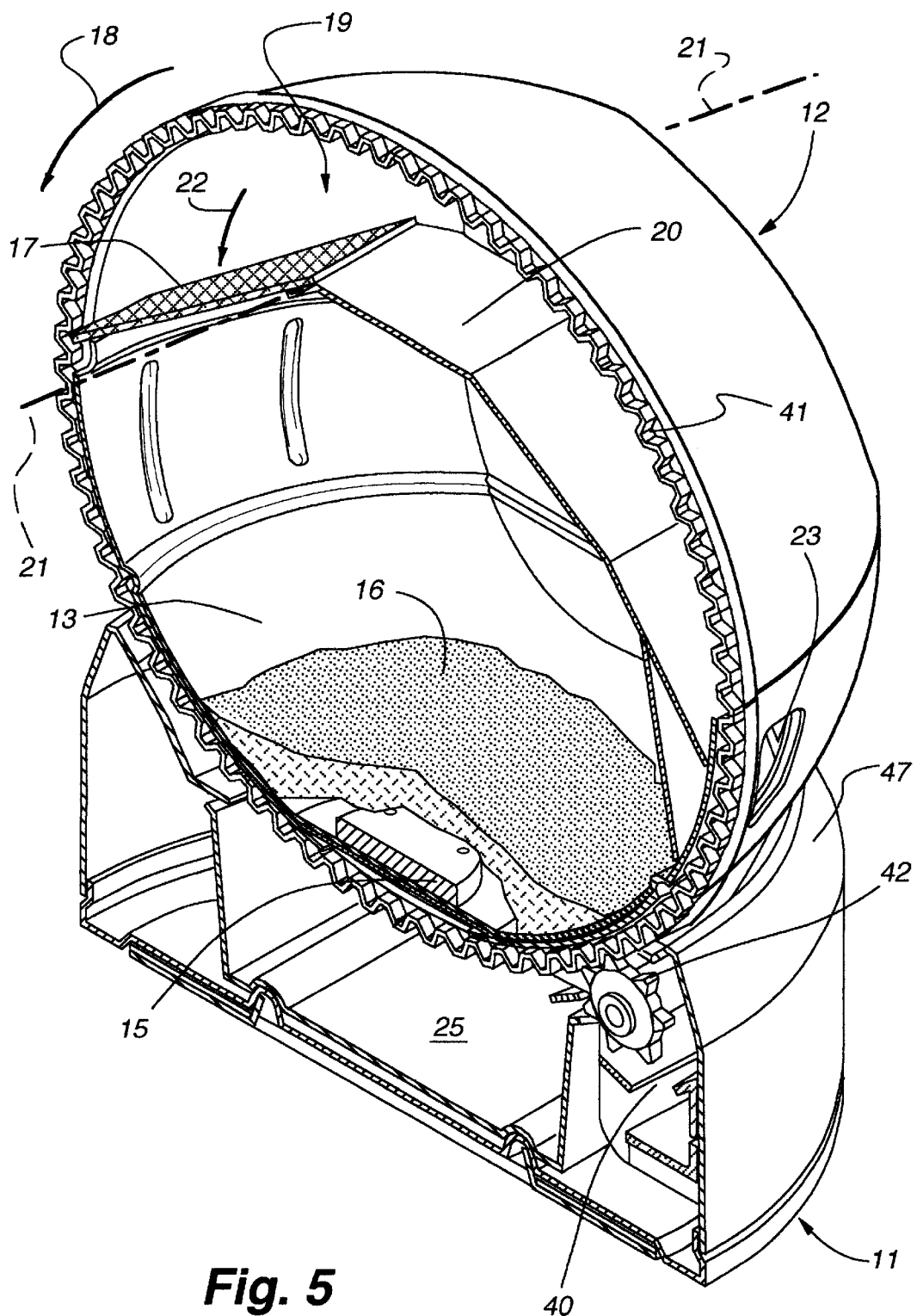
FIG. 5 is a section perspective view of the device of FIG. 4.

In an embodiment of the invention, separator wall 20 was not moveable. Within the spirit and scope of this invention, screen 17 can be non-movable, or screen 17 can be spring-biased and pivotally mounted along a horizontal axis 21 (see FIG. 5) such that screen 17 blocks movement of litter mass 16 into compartment 19, but pivots out of the way (see arrow 22 of FIG. 5) when clean litter mass 16 later moves out of compartment 19 on its way back to the operating location that is shown in FIG. 5.

Waste that exits chamber 12 through waste openings 23, gravity drops down into a removable drawer 25 that is contained in support base 11. Preferably, and as is shown in FIG. 1, drawer 25 includes a forward-extending step 31 for use by a cat as the cat enters and exits chamber 12 through a front-disposed animal opening 32 that includes a cat-usable forward-extending lip 33.

Figure 4:
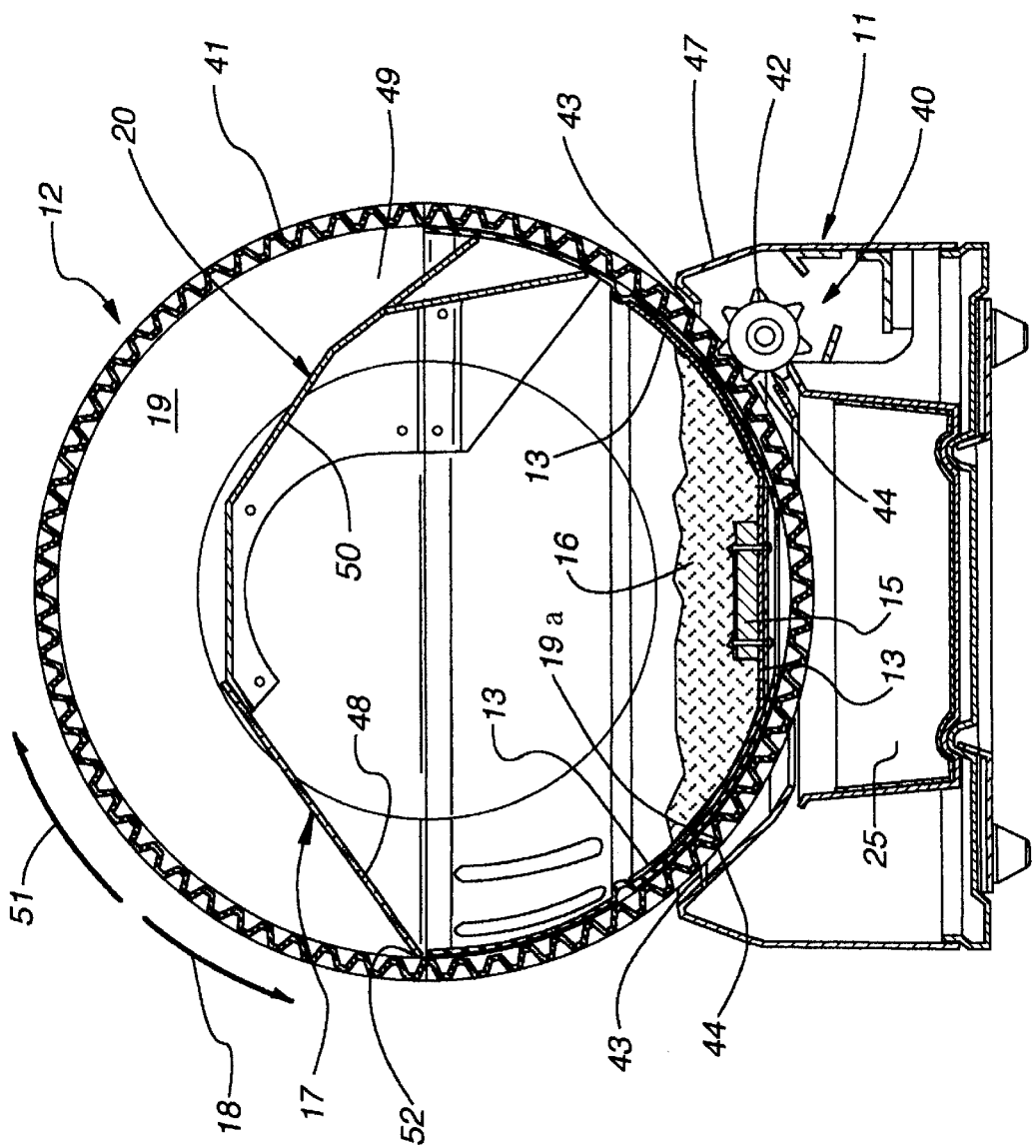
FIG. 4 is a section view of the device of FIG. 1 taken along the line 4—4 of FIG. 3.

Bi-directional rotation of chamber 12 about axis 14 is provided by operation of a bi-directional motor 40 best seen in FIG. 4. Chamber 12 includes an annular gear track 41 that lies in a vertical plane that extends perpendicular to horizontal axis 14. Gear track 41, in turn, cooperates with a gear 42 that is secured to the output shaft of motor 40. Gear 42 lies in a common vertical plane with gear track 41. Rotation of gear 42 in one direction produces CCW rotation of chamber 12 about axis 14 (as viewed from the front of the device), whereas rotation of gear 42 in the opposite direction produces clockwise (CW) rotation of chamber 12 about axis 14.

Figure 3:
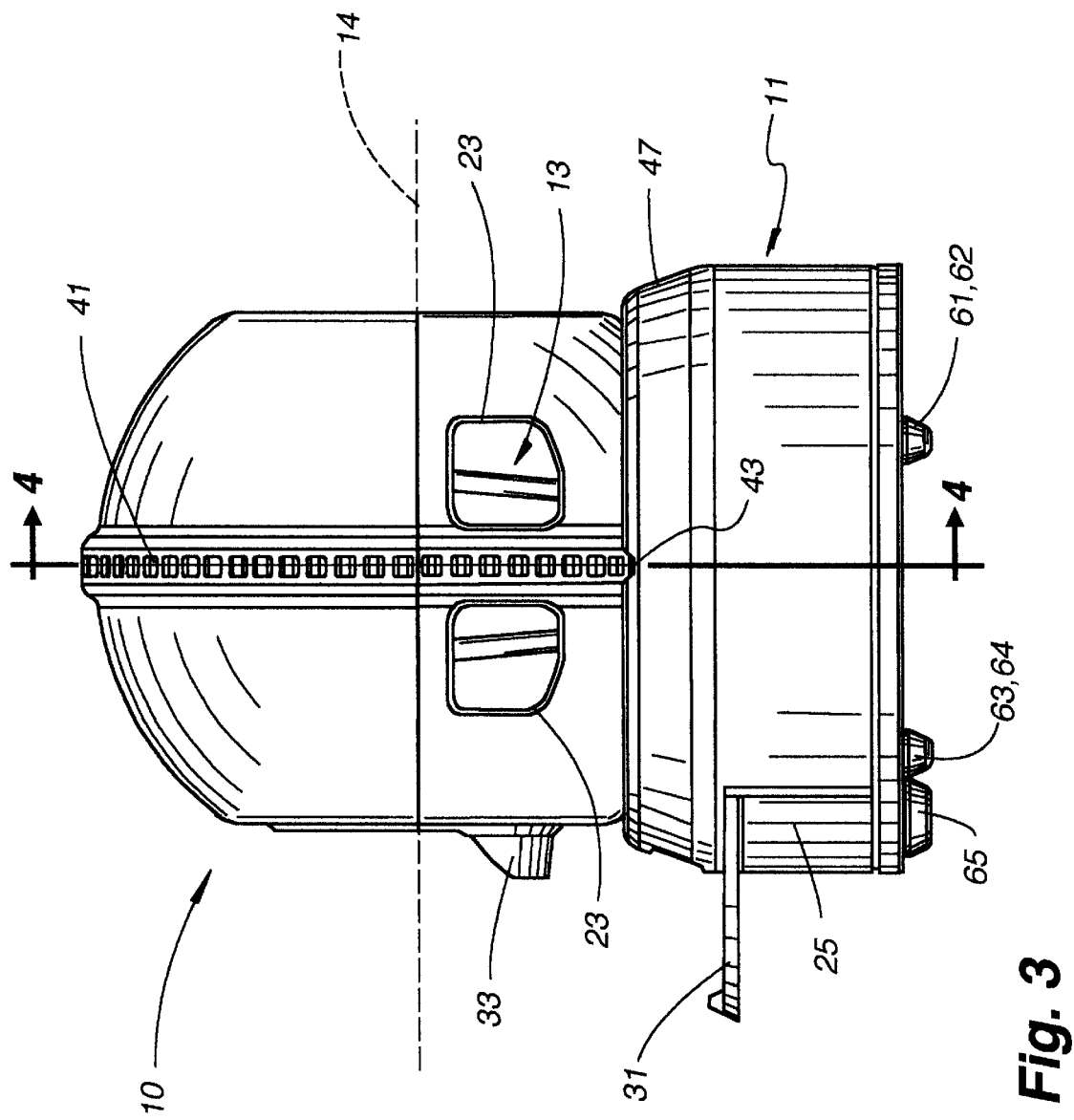
FIG. 3 is a right-side view of the device of FIG. 1 that better shows the waste discharge openings.

As seen in FIGS. 1, 3 and 4, gear track 41 freely passes through two diametrically-opposed slots 43 that are formed in the upper, circular, opening of support base 11 into which chamber 12 is removably placed. Slots 43 are relatively small in size to prevent the insertion and the pinching of fingers and the like.

In order to provide a stable surface for the support of chamber 12, in an embodiment of the invention, the upper portion 47 of support base 11 was formed as a portion of an upward extending cone.

As can be best seen in FIG. 6, in an embodiment of the invention, flexible liner 13 included two diametrically-opposed slots 45 that matched the inner surface of chamber 12 and were located coincident with the two slots 43 within support base 11, and liner 13 also included a U-shaped slot 46 that was located coincident with animal ingress/egress opening 32 within the front of chamber 12.

FIG. 4 shows the home position of chamber 12. In this home position, litter mass 16 awaits use by an animal, such as a cat, that enters chamber 12 through opening 32. After the cat has deposited waste within litter mass 16, after the cat has exited chamber 12, and after a measured time period (for example, seven minutes) has expired, motor 40 is energized to rotate chamber 12 in a CCW direction as indicated by arrow 18. As CCW rotation 18 progresses, litter mass 16 first encounters screen 17, whereupon waste material is filtered from the litter. Relatively clean litter then passes through screen 17 and into compartment 19 as the waste material resides on the outer face 48 of screen 17.

Continued CCW rotation 18 of chamber 12 now causes the clean litter to move toward the bottom 49 of compartment 19 as the waste material slides along the outer surface 50 of separator wall 20. When CCW 18 rotation of chamber 12 has caused waste openings 23 to be positioned generally vertically above tray 25, the waste material gravity falls into tray 25 that is contained within support base 11. As described in U.S. Pat. No. 5,662,066, tray 25 may include a storage bag whose open mouth automatically closes when tray 25 is manually opened.

After CCW rotation of chamber 12 has produced the above-described dumping of waste material into tray 25, motor 40 is energized to produce CW rotation 51 of chamber 12. CW rotation 51 of chamber 12 now results in the clean litter moving out of compartment 19 to return to the home position that is shown in FIG. 4. During this return movement, litter 16 may pass through screen 17, or if screen 17 is pivotally mounted, screen 17 may pivot out of the way as the end 52 of screen 17 rides on top of the moving mass of litter 16.

If desired, CW rotation 51 of chamber 12 may be continued past the FIG. 4 home position, whereupon motor 40 is energized to again produce CCW rotation 18 of chamber 12 to return chamber 12 to its FIG. 4 home position. This manner of rotation control of chamber 12 may be provided to effect the leveling of litter mass 16 in its final home position.

Figure 10:
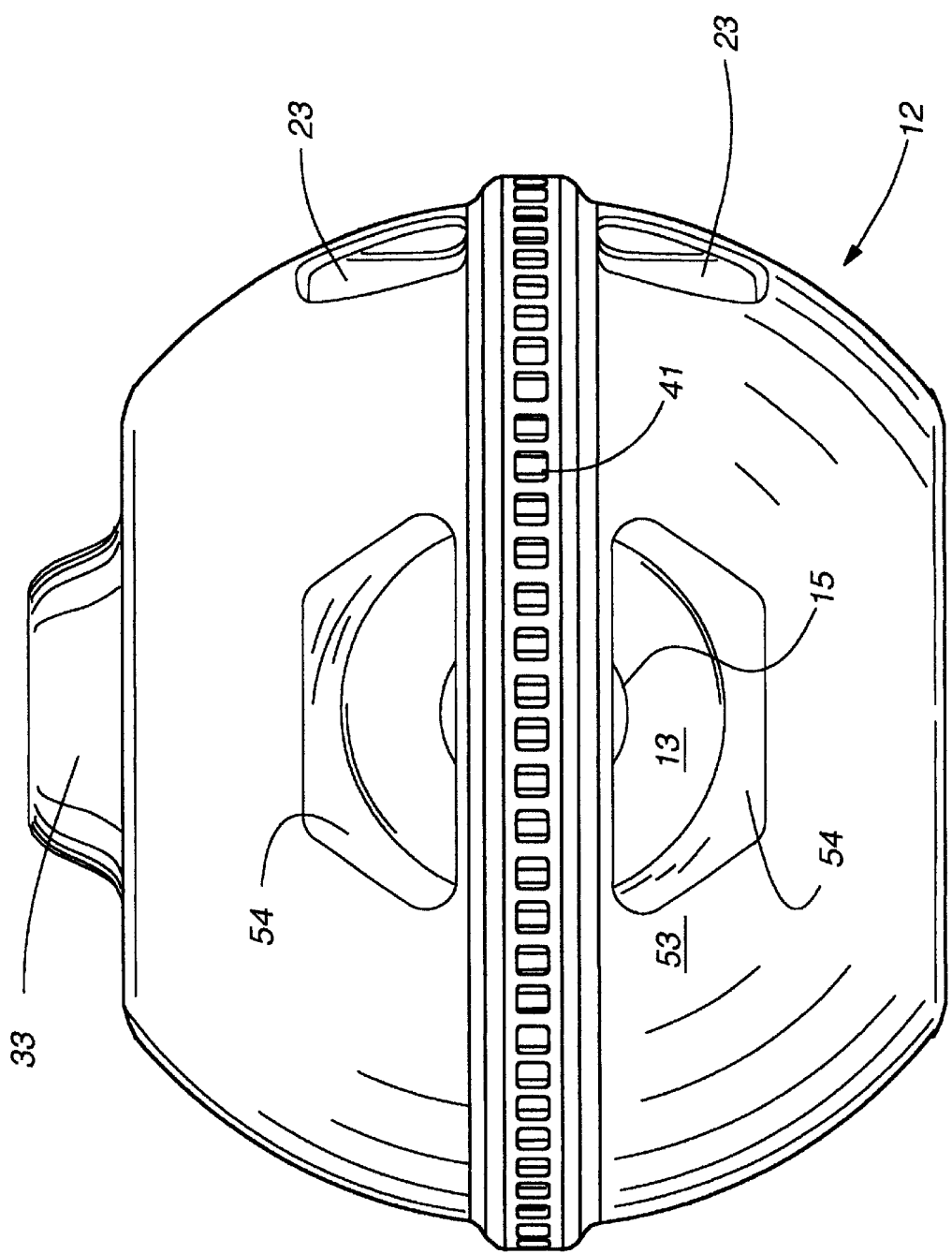
FIG. 10 is a bottom view of the device rotatable chamber showing two air-flow holes that ensure the gravity dropping of the liner away from the lower interior surface of the chamber when the chamber is inverted.

With reference to FIG. 10, as a feature of the invention, the bottom wall portion 53 of chamber 12 against which flexible liner 13 physically rests when chamber 12 is in its FIG. 4 home position includes one or more ambient air passages 54. Air passage(s) 54 is provided to ensure that flexible liner 13 will easily disengage from the adjacent interior surface of bottom wall portion 53 and gravity fall downward, when liner 13 is raised vertically by CCW rotation 18 of chamber 12. That is, air passage(s) 54 prevents forces, such as vacuum, from causing liner 13 to adhere to this interior surface of wall portion 53. If desired, the size of air passage(s) 54 can be established to produce a desired rate of downward movement or falling by liner 13.

A feature of the invention provides that cat litter device 10 is physically supported on a floor, or the like, by a three point or triangular support system when a cat is not within chamber 12, and by a more stable four point or rectangular support system when a cat is resident within chamber 12, as will be now described with reference to FIGS. 7 and 8, wherein cycling from the three-point system to the four-point system and then back to the three-point system operates to automatically initiate a litter-cleaning cycle of device 10.

Figure 7:
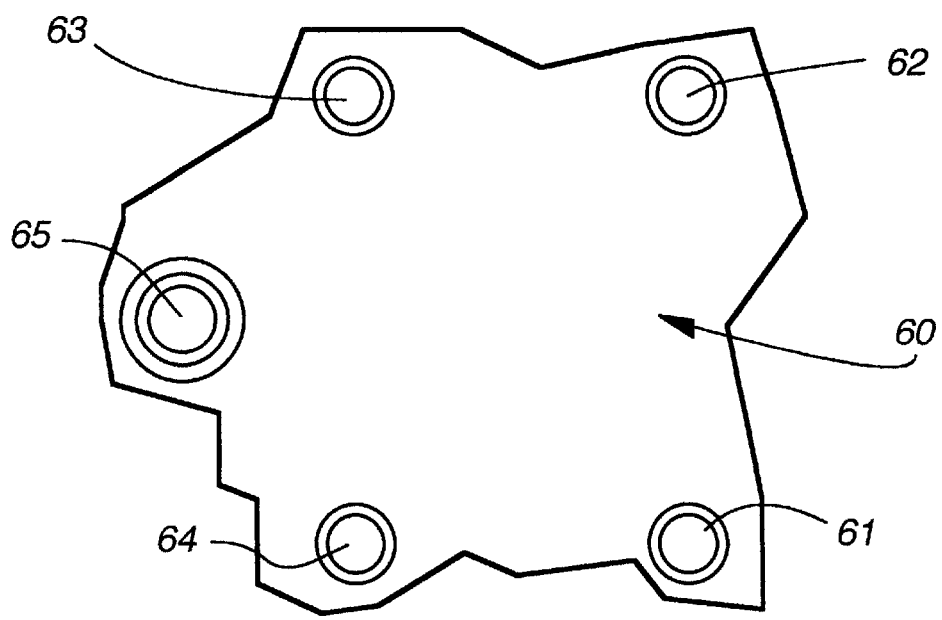
FIGS. 7 and 8 are simplified bottom views of the FIG. 1 device showing four fixed-position support legs and one downwardly spring-biased and switch-operating leg that selectively support the device on a horizontal floor in two different manners as a function of whether or not a cat is present in the device litter-containing chamber.
Figure 8:
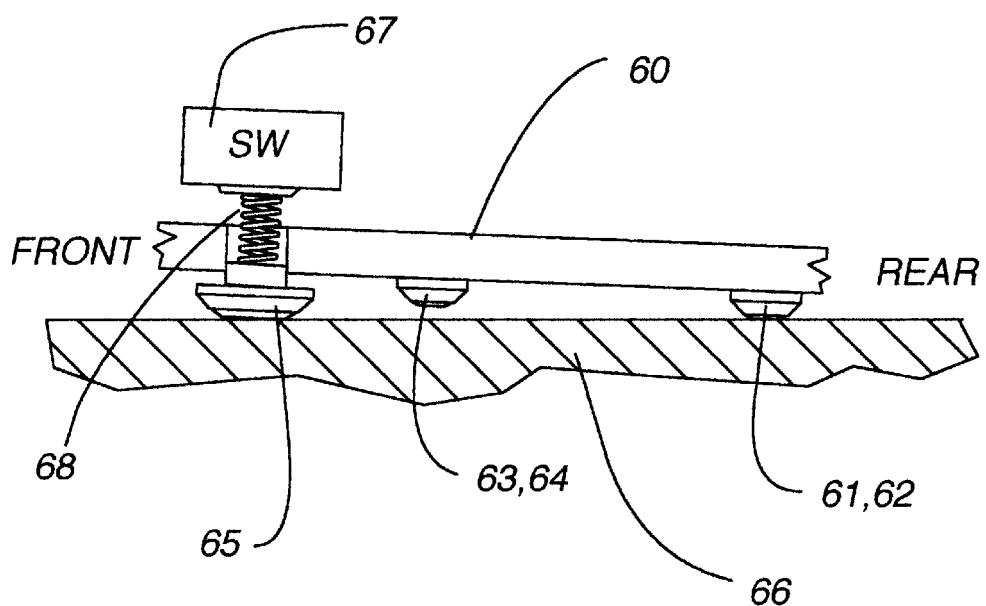

FIG. 7 is a simplified view showing the bottom wall 60 of support base 11, and FIG. 8 is a side view of FIG. 7, both figures showing two fixed position and rear-disposed support legs 61 and 62, two fixed position and front-disposed support legs 63 and 64, and one downwardly force biased and front disposed switch-operating support leg 65, these five legs selectively operating to support cat litter device 10 on a horizontal floor 66 or the like. Note that front-disposed support legs 63–65 are located generally under step 31, as shown in FIG. 3.

As shown in FIG. 8, a spring or the like 68 force biases switch-operating leg 65 downward such that in the absence of a cat within chamber 12, device 10 is supported by the three support legs 61, 62 and 65. In this condition, the bottom surface 60 of support base 11 is slightly out of parallel with floor 66. However, when a cat enters chamber 12, the weight of the cat operates to overcome the force bias of spring 68, support leg 65 moves upward relative to surface 60, and this upward movement of support leg 65 activates a switch 67 from a first state to a second state. Switch 67 remains in this second state as long as the cat remains in chamber 12. In addition, the front of device 10 now lowers to place fixed position legs 63 and 64 into contact with floor 66, thus providing a physically stable four-point support (61, 62, 63, 64) for device 10 as long as the cat remains within chamber 12. Later, when the cat exits chamber 12, the three-point support of FIG. 7 is reestablished as switch 67 returns to its first state.

As will be described, the cycling of switch 67 by a cat entering and then exiting chamber 12 is used to trigger an automatic cleaning cycle of the litter 16 that is within chamber 12.

Figure 9:
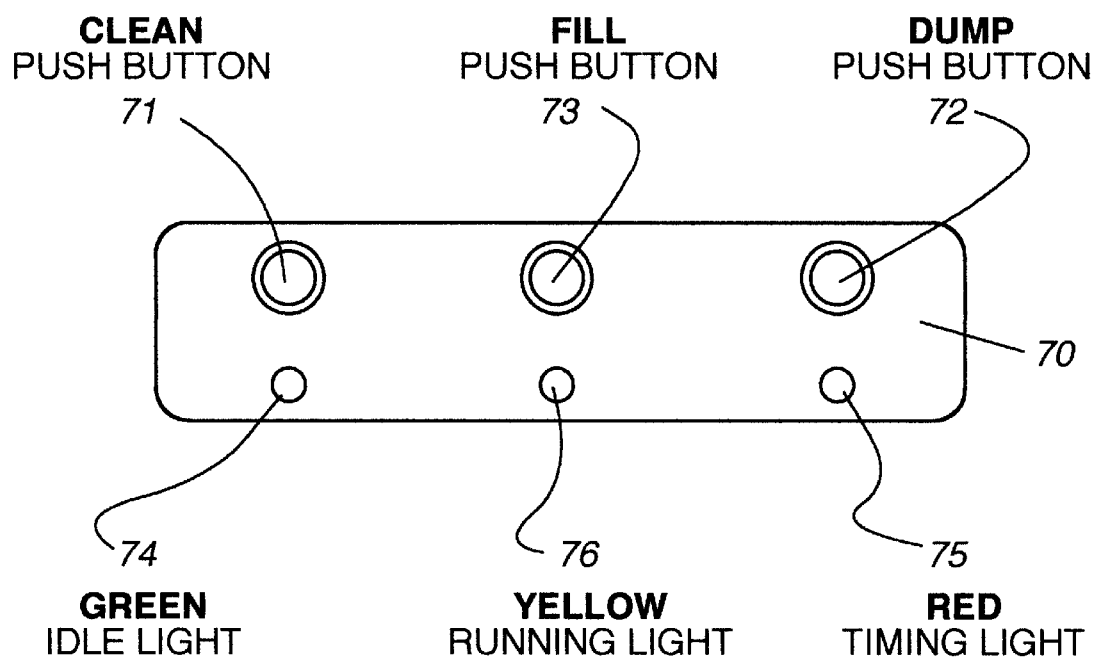
FIG. 9 shows three push buttons and three indicator lights that are contained within a control panel carried by the front of FIG. 1 support base.

FIG. 9 shows control panel 70 of FIG. 1. Control panel 70 includes three manually-operable push buttons 71–73 and three indicator lights 74–76.

Push button 71 is a "clean" push button that, when momentarily depressed, initiates a waste dump rotational cycle of chamber 12, wherein chamber 12 first rotates CCW to bring waste openings 23 to be vertically positioned over drawer 25. In this position, animal waste and litter clumps drop vertically down into drawer 25. As above-described, the gravity falling of liner 13 assists in this waste disposal operation. After the waste has been disposed of, chamber 12 automatically rotates CW (perhaps with a short time delay) to again place chamber 12 it is home position. When the home position of chamber 12 (shown in FIG. 1) is detected, a timer is initiated as CW rotation continues for a short time interval. At the end of this short time interval, chamber 12 again rotates CCW to thereby again place chamber 12 in its FIG. 1 home position, whereupon rotation of chamber 12 ends. This later CW/CCW rotation sequence of chamber 12 about the home position of chamber 12 is provided in order to level mass litter 16 that is in chamber 12, such that mass litter 16 assumes the generally level attitude that is shown in FIG. 4.

It is to be noted that the above-described clean cycle may also be automatically initiated upon initial power-on of cat litter device 10.

Push button 72 is a "dump" (or "empty") bush button that, when momentarily activated, initiates a litter dump rotational cycle of chamber 12, wherein chamber 12 rotates CW to bring waste openings 23 to be vertically positioned over drawer 25. In this position, all the material that is within chamber 12 drops vertically down into drawer 25, thus emptying chamber 12. If desired, liner 13 can be configured to assist in this dumping operation. Chamber 12 is maintained in this position, such that manually cleaning of chamber 12 may be effected, if desired.

Push button 73 is a "fill" bush button that, when momentarily activated, initiates a rotational cycle of chamber 12 wherein chamber 12 rotates CCW to bring waste openings 23 to be positioned at, or near, the top of chamber 12. In this rotational position of chamber 12, waste openings 23 are positioned to receive new litter that can be dropped vertically downward into chamber 12. Usually, "fill" push button 73 is activated after the above-described litter dump/empty cycle. After new litter has been placed within chamber 12, it is desirable to momentarily depress any push button to thereby initiate the above-described waste-dump cycle primarily for the purpose of leveling the new litter within chamber 12.

Any cycle can be interrupted or stopped by pressing any push button, whereupon the interrupted cycle will resume and finish by again pressing any push button. For example, if a fill litter cycle is interrupted, and a push button is then pressed, chamber 12 returns to its home position after a litter leveling overrun of the home position; if a dump/empty litter cycle is interrupted, and a push button is then pressed, chamber 12 returns to its home position without a litter-leveling overrun operation; and if a dump-waste cycle is interrupted and a push button is then pressed, chamber 12 continues the cycle from the point of interruption.

A red indicator light 75 is illuminated whenever chamber 12 is rotating, and a yellow indicator light 76 is illuminated whenever leg switch 67 senses that a cat is within chamber 12 or whenever chamber 12 is in a mid-cycle position. A green "idle" light 74 is energized when chamber 12 is at its home position, awaiting use by a cat. A yellow "running" light 76 is energized whenever chamber 12 is under any of its control conditions. Red light 75 is also illuminated when a time interval is being measured as chamber 12 is stationary.

When a fault is detected, all three of the lights 74–76 are controlled to sequentially turn on and then off, i.e., to blink. As an example of such a fault condition, assume that chamber 12 has been lifted off of support base 11, for example in order to clean chamber 12. Now assume that chamber 12 has been replaced on support base 11 in a reverse manner (i.e., with opening 32 on the opposite side device 10 from cat-step 31). Motor 40 is now energized to seek the home position of chamber 12. However, since the position of chamber 12 on support base 11 is not correct, the home position of chamber 12 cannot be detected, the motor control system times-out, the motor is deenergized, and all three of the lights 74–76 are energized to blink.

Figure 11:
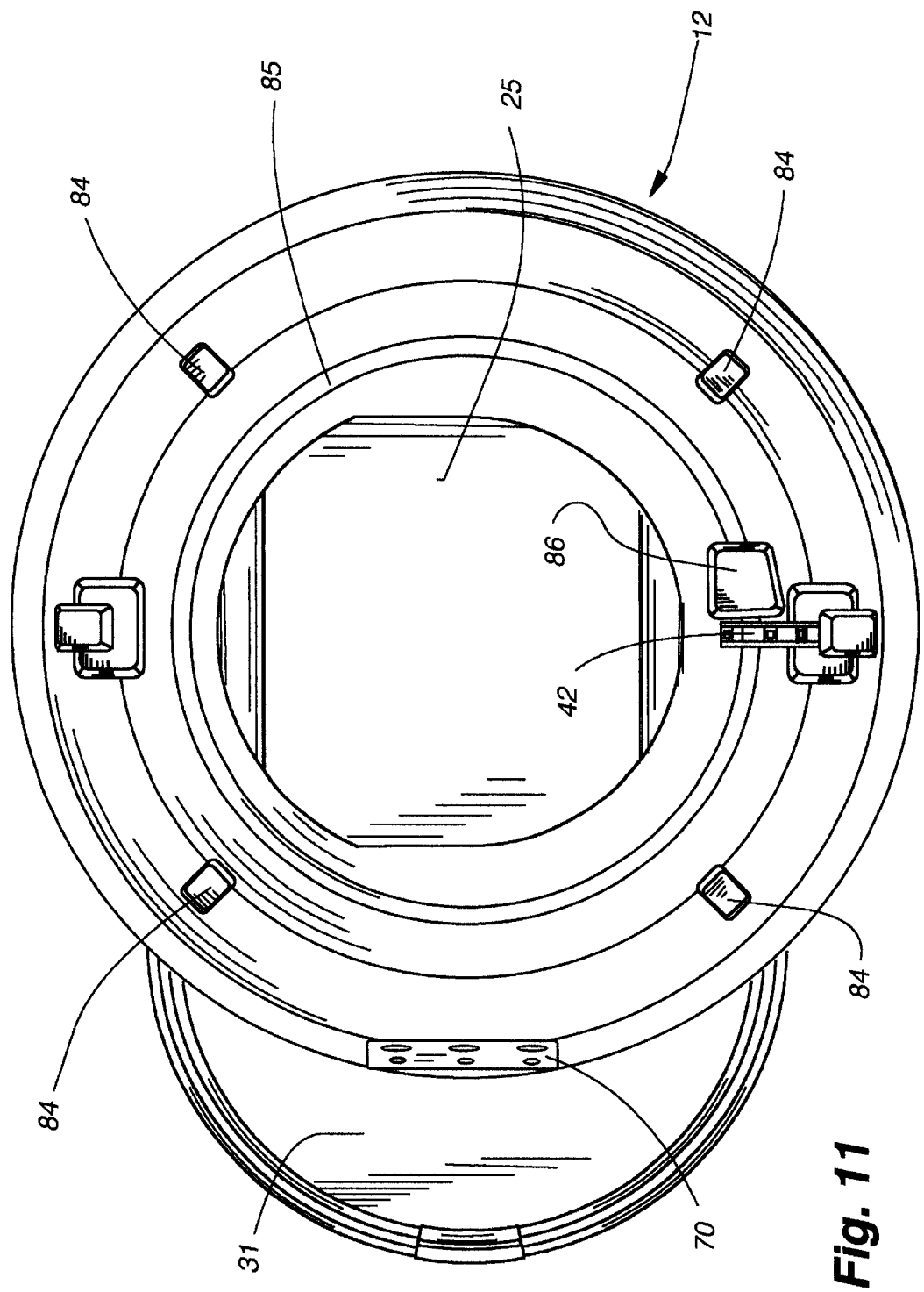
FIG. 11 is a top view of the device support base showing four low-friction buttons that support the rotatable chamber, showing an annular foam seal that cooperates with the rotatable chamber, and showing the location of a bi-polar Hall sensor.

FIG. 11 is a top view of device 10 support base 11, this figure showing four 90-degree spaced low friction buttons 84 (for example, Teflon buttons) that support rotatable chamber 12 and an annular foam seal 85 that cooperates with the bottom of rotatable chamber 12 when the chamber is placed on top of support base 11. FIG. 11 also shows a bi-polar Hall sensor 86 that is located within support base 11 and at a location that is closely adjacent to gear 42.

Figure 12:
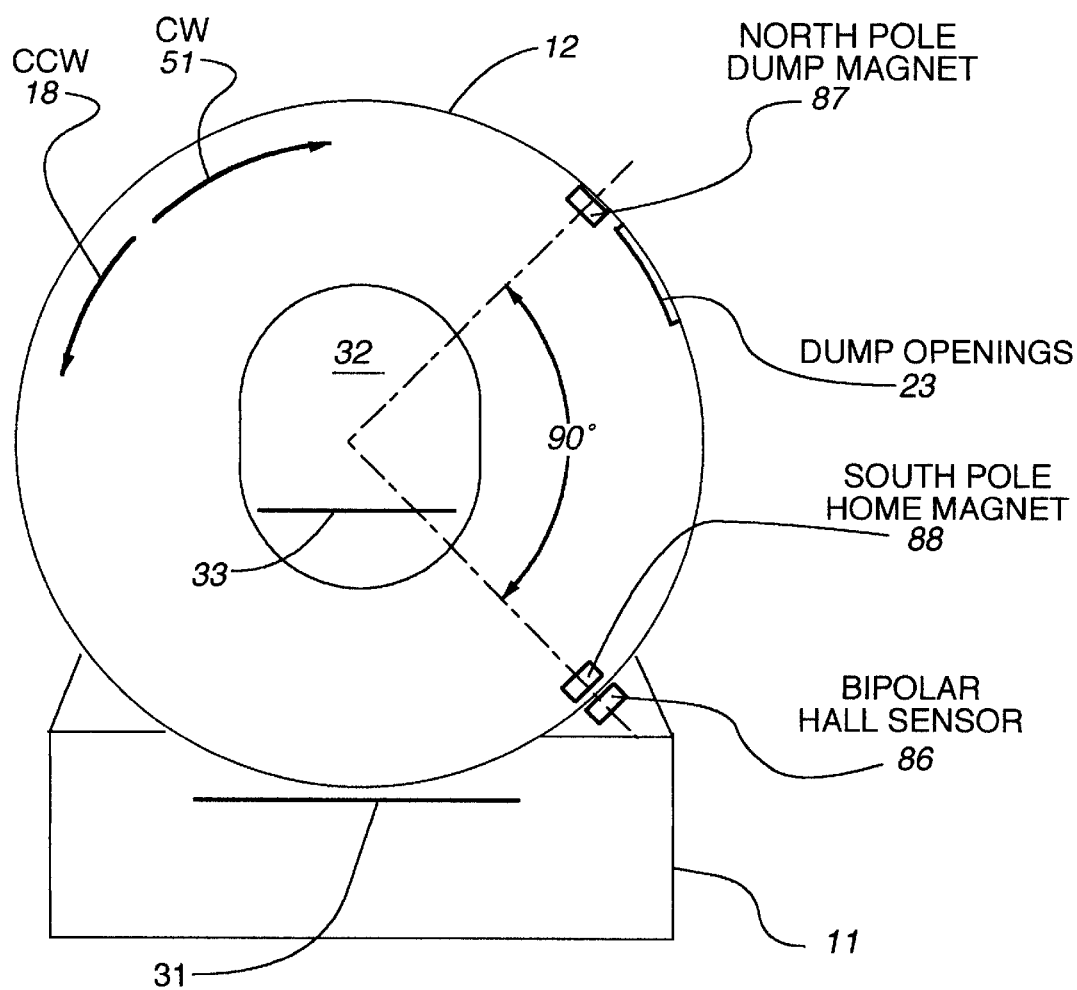
FIG. 12 is a simplified front view of the device of FIG. 1, this figure being useful in describing the Hall effect sensing of the position of the rotatable chamber of FIG. 1.

As best seen in FIG. 12, chamber 12 carries two magnets 87 and 88 that are fixed to the interior surface of chamber 12. The respective magnets 88 and 87 enable Hall sensor 86 to detect when chamber 12 is in its home position or in its dump position. As is well known, a bi-polar Hall sensor provides a first output when south magnetic pole magnet 88 is adjacent thereto, and provides a second output when north magnetic pole magnet 87 is adjacent thereto.

In manufacturing practice, chamber 12 is manually rotated to its home position; i.e., the position shown in FIG. 12. Magnet 88 is then manually positioned inside of chamber 12, whereupon magnet 88 is manually moved to be positioned directly over Hall sensor 86. The device microprocessor control system (now in a test mode) is configured such that red LED 75 will be illuminated when a south magnetic pole is detected by Halls sensor 86. If green LED 74 is illuminated, magnet 88 is presenting a north pole to Hall sensor 86, and it is necessary to turn magnet 88 over so that a south magnetic pole is presented to Hall sensor 86. Magnet 88 is then secured to the interior surface of chamber 12 as by gluing or the like.

The above procedure is then repeated with chamber 12 in its dump position (i.e., with dump openings 23 at the lowermost portion of chamber 12). In this manner, north magnet pole magnet 87 is positioned within chamber 12 for detection by Hall sensor 86 when chamber 12 is in its dump position. In a particular embodiment of the invention, magnets 86 and 87 were separated by about 90-degrees as is indicated in FIG. 12.

Figure 13:
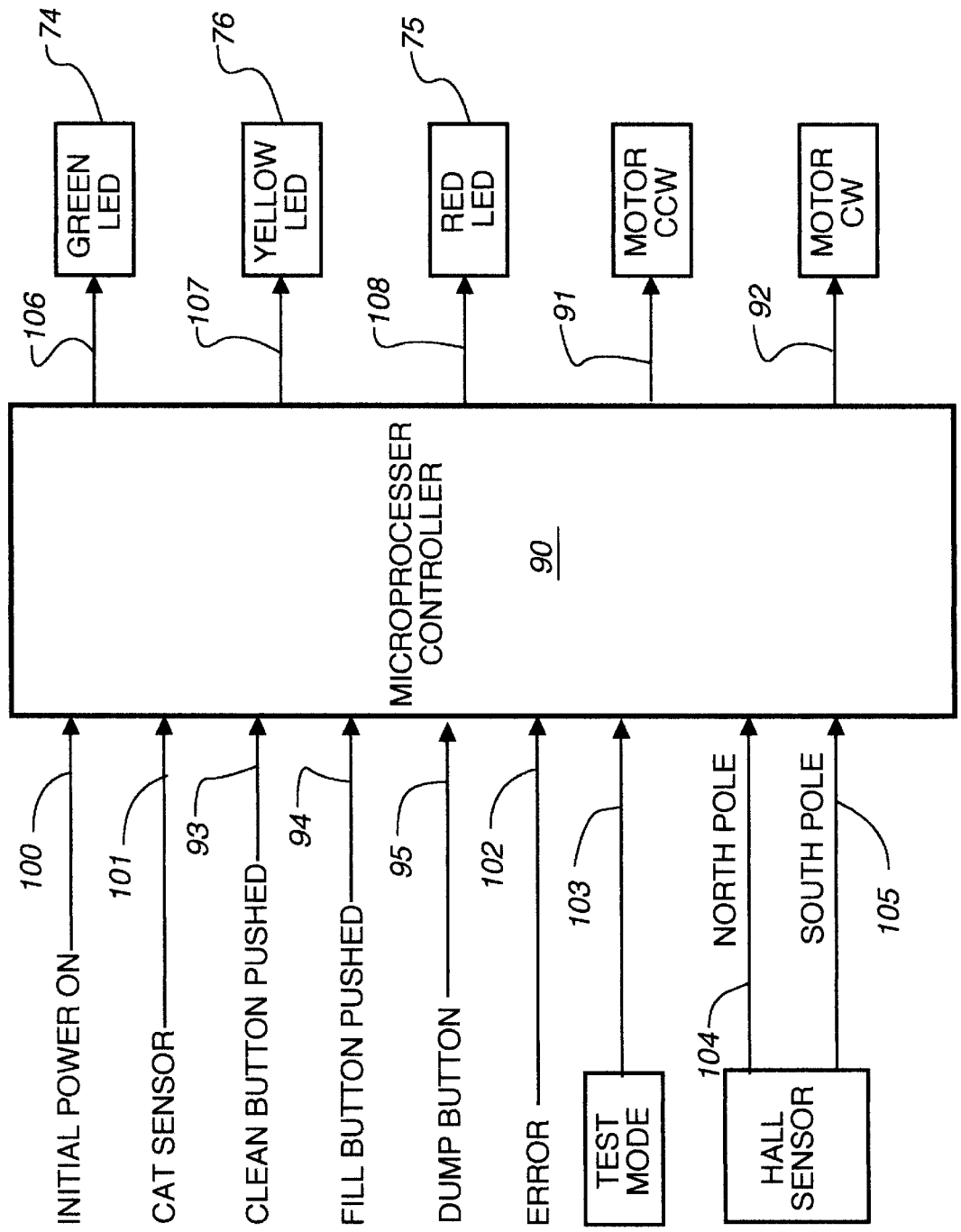
FIG. 13 shows a microprocessor-based control system for controlling the animal litter device of the invention.

FIG. 13 shows a microprocessor-based controller 90 that was used in an embodiment of the invention. While a microprocessor controller having firmware logic is preferred within the spirit and scope of the invention virtually any type of controller can be used to implement the invention as described below.

Controller 90 is provided with nine input signals, i.e. (1) an initial power-on input 100 indicating the initial connection of cat litter device 10 to a source of AC power, (2) an input 101 that comprises the output of a cat sensor, for example FIG. 8 leg switch, (3) an input 93 indicating that FIG. 9 "clean" push button 71 has been momentarily or time interval depressed, (4) an input 94 indicating that FIG. 9 "fill" push button 71 has been momentarily or time interval depressed, (5) an input 95 indicating that FIG. 9 "dump" or "empty" push button 72 has been momentarily or time interval depressed, (6) an input 102 indicating an error condition (to be described below), (7) an manual input 103 that sets controller 90 to a test mode, (8) an input 104 indicating that Hall sensor 86 has sensed north pole magnet 87, and (9) an input 105 that indicating that Hall sensor 86 has sensed south pole magnet 88.

As will be described, controller 90 responds to the above-noted input signals to provide five output signals, i.e. (1) an output 106 that provides for the energization of FIG. 9 green LED 74, (2) an output 107 that provides for the energization of FIG. 9 yellow LED 76, (3) an output 108 that provides for the energization of FIG. 9 red LED 75, (4) an output 91 that provides energization of motor 40 in a sense to cause chamber 12 to rotated in FIG. 12 CCW direction 18, and (5) an output 92 that provides energization of motor 40 in a sense to cause chamber 12 to rotated in FIG. 12 CW direction 51.

When power-on signal 110 is presented to controller 90, the controller operates to provide a clean mode of operation for cat litter device 10 as described below.

When cat sensor input 101 is presented to controller 90, the controller begins measuring a 7 minute time interval, and at the end of this time interval, a clean mode of operation is provided for cat litter device 10. Without limiting the spirit and scope of the invention to a particular type of cat sensor, in the embodiment of the invention shown in FIGS. 7 and 8, the presence of a cat within chamber 12 is sensed by switch 67 moving from a first switch state to a second switch state. Later, when the cat leaves chamber 12, switch 67 moves from the second switch state back to the first switch state. It is this cycling of switch 67 that operates to begin the 7 minute timing interval. However, should a second cat enter chamber 12 during this 7 minute interval, the timing operation is aborted, and begins again only when the second cat subsequently exits chamber 12.

Controller 90 is also operable to measure an extended period of non-use of cat litter device 10, and after a period such as 12 hours, controller 90 institutes a clean mode of operation of cat litter device 10.

Error input 102 is presented to controller 90 when an excessive current is detected flowing to motor 40, or when Hall sensor 86 is unable to detect a magnet 87, 88 within a given time interval. For example, should chamber 12 be manually removed from support base 11, and thereafter returned to support base 11 in a reverse manner, rotation of chamber 12 does not result in a magnet 87, 88 passing in front of Hall sensor 86. When controller 90 is presented with an error input 102, energization of motor 40 is interrupted. Thereafter, cat litter device 10 can be returned to its normal operation by pressing and holding any of the three push buttons 74–76 for a 4 second interval. That is by the presence of a controller input 93–95 for 4 second.

Test input 103 is manually provided to place controller 90 in a test mode of operation. In the test mode of operation, leg switch 67, Hall sensor 86 and the rotation of motor 40 can be tested. More specifically, (1) pushing "clean" push button 71 will cause motor 40 to rotate CW, (2) pushing "dump" push button 72 will cause motor 40 to rotate CCW, (3) manually pushing down on cat litter device 10 will operate leg switch 67 and yellow LED 76 will be energized when the leg switch operates properly, (4) "green" LED 74 will be energized when Hall sensor 86 properly detects the presence of north pole dump magnet 87, and (5) "red" LED 75 will be energized when Hall sensor 86 properly detects the presence of south pole home magnet 88.

In addition, controller 90 (or an equivalent control means) is constructed and arranged to provide four basic modes of operation of cat liter device 10.

Clean Mode of Operation

In a clean mode of operation, controller output 91 energizes motor 40 so that chamber 12 rotates CCW from its FIG. 12 home position. Chamber rotates CCW about 270-degrees on horizontal axis 14 until Hall sensor 86 detects north pole magnet 87. CCW energization 91 of motor 40 now ends, thus positioning dump openings 23 vertically over drawer 25. This deenergized state of motor 40 is now maintained for a short time interval, as is measured by controller 90, and as any animal waste present in litter mass falls vertically down into drawer 25.

At the end of this short time interval, controller output 92 effects CW energization of motor 40. CW rotation 51 of chamber 12 now causes south pole magnet 88 to return to the FIG. 12 home position. When Hall sensor 86 detects magnet 88, a timer is started within controller 90. This timer operates to maintain CW rotation 51 so that chamber 12 over shoots its home position by about 30-degrees. When the above-mentioned timer times out, controller 90 ends CW output 92 and begins CCW output 91. As a result, motor 40 and chamber 12 stop, and then begin rotating CCW. When south pole magnet 88 is hereafter detected by Hall sensor 86, CCW output 91 ends and chamber 12 is again positioned in its FIG. 12 home position. This rotational sequence is provided to level litter mass 16 in the home position, as above described.

Note that pushing any of the three push buttons 71–73 at any time during the above-described operation (see controller inputs 93–95) will stop the above-described mode of operation. Thereafter, pushing clean push button 71 causes controller 90 to resumes the mode of operation at the point of interruption, whereas pushing dump/empty push button 72 or fill push button 73 causes controller 90 to cancel the mode of operation, and to provide an output 91, 92 that operates to return south pole magnet 88 to Hall effect sensor 86 with a litter-level operation.

During this mode of operation, controller 90 maintains an overall time measurement, and should a given time period be exceeded, this mode of operation automatically stops.

Fill Mode of Operation

In the fill mode of operation, as enabled by operation of fill push button 73 and controller input 94, the controller's CCW output 91 is maintained for a time period that produces about 90-degrees of CCW rotation of chamber 12 from its FIG. 12 home position. Chamber 12 is maintained in this fill position, with dump openings 23 positioned at the top of chamber 12, until any one of the three push buttons 71–73 is operated, whereupon controller 90 provides CW output 92 until south pole magnet 88 is detected by Hall sensor 86. This mode of operation provides for the filling of chamber 12 with a new mass of litter 16, and the subsequent leveling of the new litter mass.

In this fill mode of operation, pushing any of the three push buttons 71–73 during the mode of operation causes controller 90 to stop the fill mode of operation, whereupon again pushing any of the three push buttons 71–73 causes controller 90 to cancel the fill mode of operation, and then provide CW motor output 92 until such time as south pole magnet 88 is detected by Hall-effect sensor 86, and with a litter leveling operation.

Dump/Empty Mode of Operation

In the dump/empty mode of operation, as enabled by operation of dump/empty push button 72 and controller input 95, the controller CW output 92 is maintained for a time period that produces about 90-degrees of CW rotation of chamber 12 from its FIG. 12 home position. Chamber 12 is maintained in this dump position, with dump openings 23 positioned at the bottom of chamber 12 until any one of the three push buttons 71–73 is operated, whereupon controller 90 provides CCW output 91 until south pole magnet 88 is detected by Hall sensor 86. This mode of operation provides for the dumping of the total content of chamber 12 into tray 25.

Pushing any of the three push buttons 71–73 during this mode of operation causes controller 90 to stop the dump mode of operation, whereupon again pushing any of the three push buttons 71–73 causes controller 90 to cancel the dump mode of operation, and then provide CCW motor output 91 until such time as south pole magnet 88 is detected by Hall sensor 86.

Lock Mode of Operation

When chamber 12 is in its FIG. 12 home position, and when controller 90 is waiting for an input (i.e., green light 74 is energized), pressing and holding any one of the three push buttons 71–73 for a time interval that is measured by controller 90 results in locking out the future momentary operation of the three push buttons 71–73; i.e., momentary operation of a push button 71–73 does not provide a corresponding input 93–95 to controller 90. When it is desired at a later time to unlock push buttons 71–73, the above-described time interval of operation of any one of the three push buttons 71–73 can be repeated.

While the invention has been described in detail with respect to specific embodiments thereof, the above detailed description is not to be taken as a limitation on the spirit and scope of the invention since it is known that both presently available and after developed constructions and arrangements can be used to implement the spirit and scope of the invention. By way of a non-limiting example, a manually-rotatable litter-containing chamber whose rotational position is visually observed in order to achieve a litter clean cycle and/or a litter dump cycle is within the spirit and scope of this invention.

What is claimed is:

1. In an animal litter device having a rotatable chamber with a surface adapted to support a quantity of litter, said rotatable chamber being rotatable to place said surface at an elevated position whereat said quantity of litter gravity falls through a screen to thereby separate animal waste and clumps of litter from said quantity of litter, the improvement comprising:

a flexible liner loosely mounted to be adjacent to said surface at a position that is intermediate said surface and said quantity of litter, said liner operating to gravity fall upon said rotation of said chamber to thereby enhance separation of said quantity of liter from said surface.

2. The improvement of claim 1 including:

a weight secured to said liner at a position that is generally adjacent to said surface.

3. The improvement of claim 1 including:

airflow means associated with said surface and said liner and operable to provide a flow of air to a space that is formed intermediate said surface and said liner when said liner gravity-falls.

4. The improvement of claim 3 wherein said airflow means provides a controlled flow of air to thereby control a rate of gravity-fall of said liner.

5. The improvement of claim 4 wherein:

said surface is a curved surface; and said liner is a curved liner having a shape complementing said curved surface.

6. The improvement of claim 5 wherein:

said liner is formed of a polymer that is shaped to form said complementary shape.

7. The improvement of claim 6 including:

a weight secured to said liner.

8. The improvement of claim 1 including:

a three-leg system having a first leg, a second leg, and a third leg operable to support the animal litter device on a generally horizontal surface in the absence of an animal being within said rotatable chamber;

said three-leg system defining a generally triangular leg arrangement wherein a first of said three legs is force-biased toward the horizontal surface and a second and third of said three legs are mounted at fixed positions relative to the horizontal surface; and a four-leg system including a fourth leg and a fifth leg operable to support the animal litter device on the horizontal surface in the presence of an animal within said rotatable chamber;

said four-leg system defining a generally rectangular leg arrangement that includes said second and third legs and fourth and fifth legs that are mounted generally adjacent to said first leg and at vertically fixed positions relative to the horizontal surface.

9. The improvement of claim 8 including:

an animal-present switch operated by said first leg so long as an animal remains present within said chamber; and control means responsive to said animal-present switch operable to initiate movement of said rotation of said chamber upon the animal exiting said chamber.

10. Apparatus for receiving waste material from an animal and then disposing of said waste material comprising:

a rotatable chamber having a home position, a first opening that is operable when said chamber is in said home position for the ingress and egress of an animal, and a second opening that is operable when said chamber is rotated about a generally horizontal axis to a second position for the gravity falling of waste material through said second opening and out of said rotatable chamber;

said rotatable chamber being adapted to hold a relatively loose quantity of litter therein;

a separator wall within said rotatable chamber and located at an upper position within said rotatable chamber when said rotatable chamber is in said home position, said separator wall forming an open-mouth litter retention compartment within said rotatable chamber;

a screen closing said open mouth of said litter retention compartment such that upon rotation of said rotatable chamber to said second position, said loose quantity of litter passes through said screen and enters said litter retention compartment, as waste material within said loose quantity of litter is retained by said screen; and a flexible liner within said rotatable chamber, said flexible liner supporting said loose quantity of litter when said rotatable chamber is in said home position, and said flexible liner gravity falling away from an interior surface of said rotatable chamber when said rotatable chamber is in said second position.

11. The apparatus of claim 10 including:

a weight secured to said flexible liner, said weight assisting said gravity falling of said flexible liner away from said interior surface of said rotatable chamber when said rotatable chamber is in said second position.

12. The apparatus of claim 10 including at least one air passage formed in said interior surface of said rotatable chamber.

13. The apparatus of claim 12 wherein said at least one air passage is of a size selected to control a rate at which said flexible liner gravity falls away from said interior surface.

14. The apparatus of claim 13 including:

a weight secured to said flexible liner, said weight assisting said gravity falling of said flexible liner away from said interior surface of said rotatable chamber when said rotatable chamber is in said second position.

15. The apparatus of claim 10 including:

a triangular support system operable to support said apparatus on a generally horizontal surface in the absence of an animal being within said rotatable chamber;

said triangular support system having a first support leg that is force biased toward the horizontal surface; and a rectangular support system operable to support said apparatus on the horizontal surface in the presence of an animal within said rotatable chamber;

said rectangular support system including second and third support legs that are mounted generally adjacent to said first leg and at vertically-fixed positions relative to the horizontal surface.

16. The apparatus of claim 15 including:

an animal-present switch operated by said first support leg so long as an animal remains present within said rotatable chamber; and control means responsive to said animal present switch operable to initiate said rotation of said rotatable chamber upon the animal exiting said rotatable chamber.

17. The apparatus of claim 16 including:

a weight secured to said flexible liner, said weight assisting said gravity falling of said flexible liner away from said interior surface of said rotatable chamber when said rotatable chamber is in said second position.

18. In an animal litter device having a motor-rotatable chamber with a surface adapted to support a quantity of litter, said motor-rotatable chamber being rotatable to place said surface at an elevated position whereat said quantity of litter gravity falls through a screen to thereby separate animal waste and clumps of litter from said quantity of litter, the improvement comprising:

a three-leg support system having a first leg, a second leg, and a third leg operable to support said animal litter device on a generally horizontal surface in the absence of an animal being present within said rotatable chamber;

said three-leg support system defining a generally triangular leg arrangement wherein a first of said three legs is force-biased toward the horizontal surface and a second and third of said three legs are mounted at fixed positions relative to the horizontal surface;

a four-leg support system including a fourth leg and a fifth leg operable to support the animal litter device on the horizontal surface in the presence of an animal within said rotatable chamber;

said four-leg support system defining a generally rectangular leg arrangement that includes said second and third legs and fourth and fifth legs that are mounted generally adjacent to said first leg and at vertically fixed positions relative to the horizontal surface;

an animal-present switch operated by said first leg so long as an animal remains present within said chamber; and control means responsive to said animal-present switch and operable to initiate movement of said rotation of said chamber upon the animal exiting said chamber.

19. Apparatus containing a litter mass for receiving waste material from an animal, and for selectively discharging said waste material or discharging said litter mass from the apparatus, the apparatus comprising:

a rotatable chamber having home-position;

a first opening in said rotatable chamber operable when said rotatable chamber is in said home-position for the sequential ingress of an animal into said rotatable chamber, followed by the egress of the animal from the rotatable chamber;

a second opening in said rotatable chamber operable when said rotatable chamber is rotated in a first direction and about a generally horizontal axis from said home-position to a second-position for the gravity falling of said waste material through said second opening and out of said rotatable chamber, and when said chamber is rotated in a second direction from said home-position and about said generally horizontal axis to a said second position for the gravity falling of said litter mass through said second opening and out of said rotatable chamber;

a separator wall within said rotatable chamber;

said separator wall being located at an upper position within said rotatable chamber when said rotatable chamber is in said home-position;

said separator wall forming an open-mouth litter mass retention compartment within said rotatable chamber;

a screen closing said open mouth of said litter retention compartment such that upon rotation of said rotatable chamber in said first direction to said second position, said litter mass passes through said screen and enters said litter retention compartment as waste material within said litter mass is retained by said screen;

a flexible liner within said rotatable chamber;

a portion of said flexible liner being relatively freely moveable relative to an interior surface of said rotatable chamber;

said portion of said flexible liner physically supporting said litter mass when said rotatable chamber is in said home position;

said portion of said flexible liner gravity falling away from said interior surface of said rotatable chamber when said rotatable chamber rotates away from said home position;

first control means response to the ingress of an animal into said rotatable chamber followed by the egress of the animal from said rotatable chamber for causing rotation of said rotatable chamber in said first direction from said home position to said second position; and first manually-operable control means for causing rotation of said rotatable chamber in said second direction from said home position to said second position.

20. The apparatus of claim 19 including:

second manually-operable control means for causing rotation of said rotatable chamber in said first direction from said home position to said second position.

21. The apparatus of claim 19 including:

a timer operable to delay operation of said first control means for a time period after egress of the animal from said rotatable chamber; and means response to ingress of an animal into said rotatable chamber during said time period for aborting operation of said first control means.

22. The apparatus of claim 21 including:

second manually-operable control means for causing rotation of said rotatable chamber in said first direction from said home-position to said second position independent of a timing state of said timer.

23. The apparatus of claim 22 including:

a weight secured to said flexible liner.

24. The apparatus of claim 23 including:

air passage means formed in said interior surface of said rotatable chamber.

25. The apparatus of claim 24 including:

a triangular support system operable to support the apparatus on a generally horizontal surface in the absence of an animal within said rotatable chamber;

said triangular support system having a vertically moveable support leg that is force-biased toward the horizontal surface;

a rectangular support system operable to support the apparatus on the horizontal surface in the presence of an animal within said rotatable chamber;

said vertically-moveable support leg responding to the presence of an animal within said rotatable chamber by moving vertically upward and away from the horizontal surface, to thereby lower first and second fixed position support legs onto the horizontal surface and thereby establish said rectangular support system; and a switch operated by said vertically-moveable support leg for activating said first control means upon said switch detecting the ingress of an animal into said rotatable chamber followed by the egress of the animal from said rotatable chamber.

26. The apparatus of claim 25 including:

second manually-operable control means for causing rotation of said rotatable chamber in said first direction from said home position to said second position.

27. A method of providing a litter device for use by an animal, and for automatically cleaning a litter mass in the device after use by the animal comprising the steps of:

providing a rotatable and generally cylindrical chamber having a home-position whereat an entrance/exit opening is provided in a generally vertically-extending end of said chamber whereby an animal may enter and subsequently exit said chamber, said chamber being rotatable about a generally horizontal axis;

providing a flexible liner located at an internal bottom surface of said chamber when said chamber is in said home position;

providing a mass of litter loosely sitting on said liner when said chamber is in said home position;

providing a dump opening in a wall of said chamber, said dump opening being located at an elevated position and at one side of said entrance/exit opening when said chamber is in said home position;

providing a compartment within said chamber, said compartment having an open mouth that is closed by a litter-filtering screen, said compartment being located at an elevated position and at an opposite side of said chamber from said dump opening when said chamber is in said home position;

providing sensing means responsive to an animal entering and then exiting said chamber;

responding to said sensing means to cause said chamber to rotate in a first direction that causes said mass of litter to pass through said screen and into said compartment as waste matter is filtered from said mass of litter;

continuing said first direction of rotation of said chamber to position said dump opening at a lower portion of said chamber, whereupon the waste matter falls out of said chamber;

stopping said first direction of rotation of said chamber and beginning an opposite direction of rotation of said chamber;

sensing when said chamber has been returned to said home-position;

responding to said chamber being returned to said home-position and continuing said opposite direction of rotation of said chamber for a first measured time interval;

responding to an end of said first measured time interval and beginning rotation of said chamber in said first direction;

sensing when said chamber has been returned to said home position; and responding to said chamber being returned to said home position and stopping said chamber at said home position.

28. The method of claim 27 including the step of:

attaching a weight to said flexible liner.

29. The method of claim 28 including the steps of:

measuring a second time interval after it has been sensed that an animal has exited said chamber; and responding to an end of said second measured time interval and instituting said step of cause said chamber to rotate in a first direction that causes said mass of litter to pass through said screen and into said compartment as waste matter is filtered from said mass of litter.

30. The method of claim 29 including the steps of:

sensing that an animal has entered said chamber within said second measured time interval; and aborting said step of causing said chamber to rotate in a first direction that causes said mass of litter to pass through said screen and into said compartment as waste matter is filtered from said mass of litter.

31. The method of claim 30 including the steps of:

providing manually-operable means for effecting the dumping of said mass of litter out of said chamber;

responding to operation of said manual means and causing said chamber to rotate in said second direction to position said dump opening at a lower portion of said chamber, whereupon the mass of litter falls out of said chamber.

32. An animal litter device comprising:

a chamber that is rotatable about a generally horizontal axis, said chamber having a first rotation position and a second rotation position;

an internal portion of said chamber being disposed at a bottom of said chamber when said chamber is in said first rotation position whereat said chamber is usable by an animal;

said internal portion of said chamber being disposed generally at a top of said chamber when said chamber is in said second-rotation position whereat said chamber is not usable by an animal;

a dump opening located at a second portion of said chamber;

said dump opening being located at or near a top of said chamber when said chamber is in said first-rotation position, and being located at a bottom of said chamber when said chamber is in said second-rotatable position;

a moisture impervious and flexible liner having boarder portions thereof fixed to said chamber and having a mid-portion of said liner covering said internal portion of said chamber and movable relative thereto; and a mass of litter loosely sitting on said flexible liner when said chamber is in said first-rotation position.

33. The animal litter device of claim 32 including waste separation means within said chamber, said waste separation means operating when said chamber is rotated in a first direction between said first-rotatable position and said second-rotatable position to separate animal waste from said mass of litter, whereupon the separated animal waste exits said chamber by way of said dump opening, said animal litter device operating to cause said mass of litter to exit said chamber by way of said dump opening when said chamber is rotated in a second direction between said first-rotatable position and said second-rotatable position.

34. The animal litter device of claim 33 including a weight incorporated within said mid-portion of said liner.

35. The animal litter device of claim 34 including automatic means operable to rotate said chamber.

* * * * *